United States Patent
Filipovic et al.

(10) Patent No.: US 8,532,211 B2
(45) Date of Patent: Sep. 10, 2013

(54) METHODS AND APPARATUS FOR POWER CONTROL BASED ANTENNA SWITCHING

(75) Inventors: Daniel F. Filipovic, Solana Beach, CA (US); Yong Li, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1092 days.

(21) Appl. No.: 12/390,230

(22) Filed: Feb. 20, 2009

(65) Prior Publication Data

US 2010/0215111 A1  Aug. 26, 2010

(51) Int. Cl.
*H04B 7/02* (2006.01)

(52) U.S. Cl.
USPC ........... 375/267; 375/340; 375/346; 375/349; 375/222

(58) Field of Classification Search
USPC .................................. 375/340, 346, 349, 222
See application file for complete search history.

(56) References Cited

U.S. PATENT DOCUMENTS

| 7,039,370 | B2 | 5/2006 | Laroia et al. | |
| 7,149,483 | B1 | 12/2006 | Reinisch et al. | |
| 7,272,359 | B2 | 9/2007 | Li et al. | |
| 7,327,801 | B2 | 2/2008 | Harel et al. | |
| 2003/0083016 | A1* | 5/2003 | Evans et al. | 455/67.1 |
| 2005/0186921 | A1 | 8/2005 | Hoo et al. | |
| 2007/0093282 | A1 | 4/2007 | Chang et al. | |
| 2008/0214128 | A1* | 9/2008 | Lim et al. | 455/101 |
| 2008/0227414 | A1 | 9/2008 | Karmi et al. | |
| 2008/0227415 | A1* | 9/2008 | Harel et al. | 455/101 |
| 2008/0232325 | A1* | 9/2008 | Mehta et al. | 370/332 |
| 2009/0196372 | A1* | 8/2009 | Zhang et al. | 375/267 |

FOREIGN PATENT DOCUMENTS

| WO | WO2005039233 | 4/2005 |
| WO | WO2006060197 | 6/2006 |

OTHER PUBLICATIONS

International Search Report and Written Opinion—PCT/US2010/024811, International Search Authority—European Patent Office—Jan. 11, 2011.
Partial International Search Report—PCT/US2010/024811—International Search Authority, European Patent Office, Jul. 5, 2010.
Winters, Jack H., "Switched diversity with feedback for DPSK mobile radio systems", IEEE Transactions on Vehicular Technology, vol. VT-32, No. 1, Feb. 1983, pp. 134-150.

* cited by examiner

*Primary Examiner* — Zewdu Kassa
(74) *Attorney, Agent, or Firm* — Abdollah Katbab

(57) ABSTRACT

A method for selecting an antenna is described. The method may include transmitting using a first antenna with a first metric and a radio frequency (RF) chain for a first dwelling period. The method may include switching to transmitting using a second antenna with a second metric for a first testing period. The second antenna may use the same RF chain as the first antenna. The first metric may be compared with the second metric to determine an optimal antenna. The optimal antenna may be selected.

28 Claims, 15 Drawing Sheets

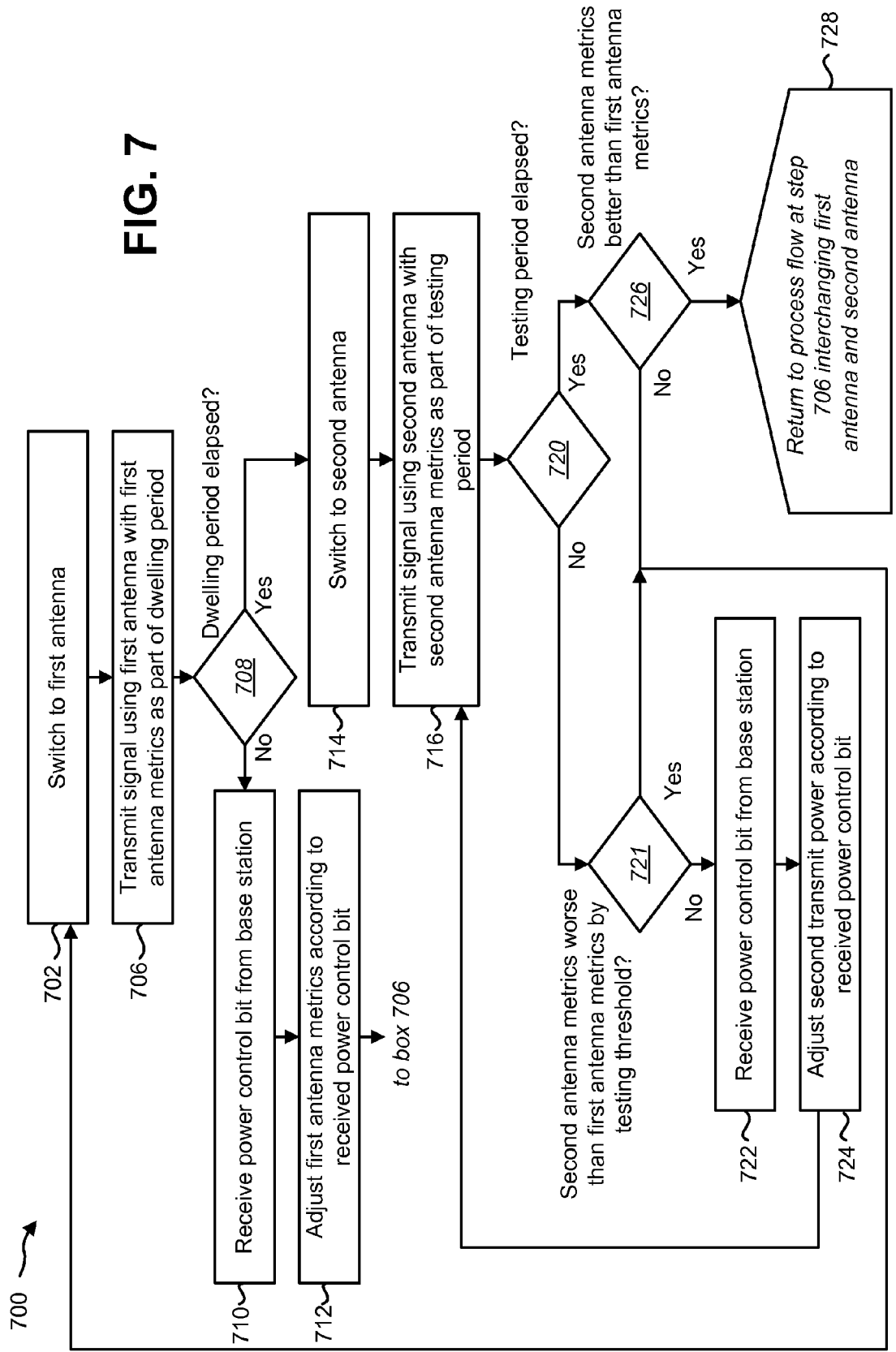

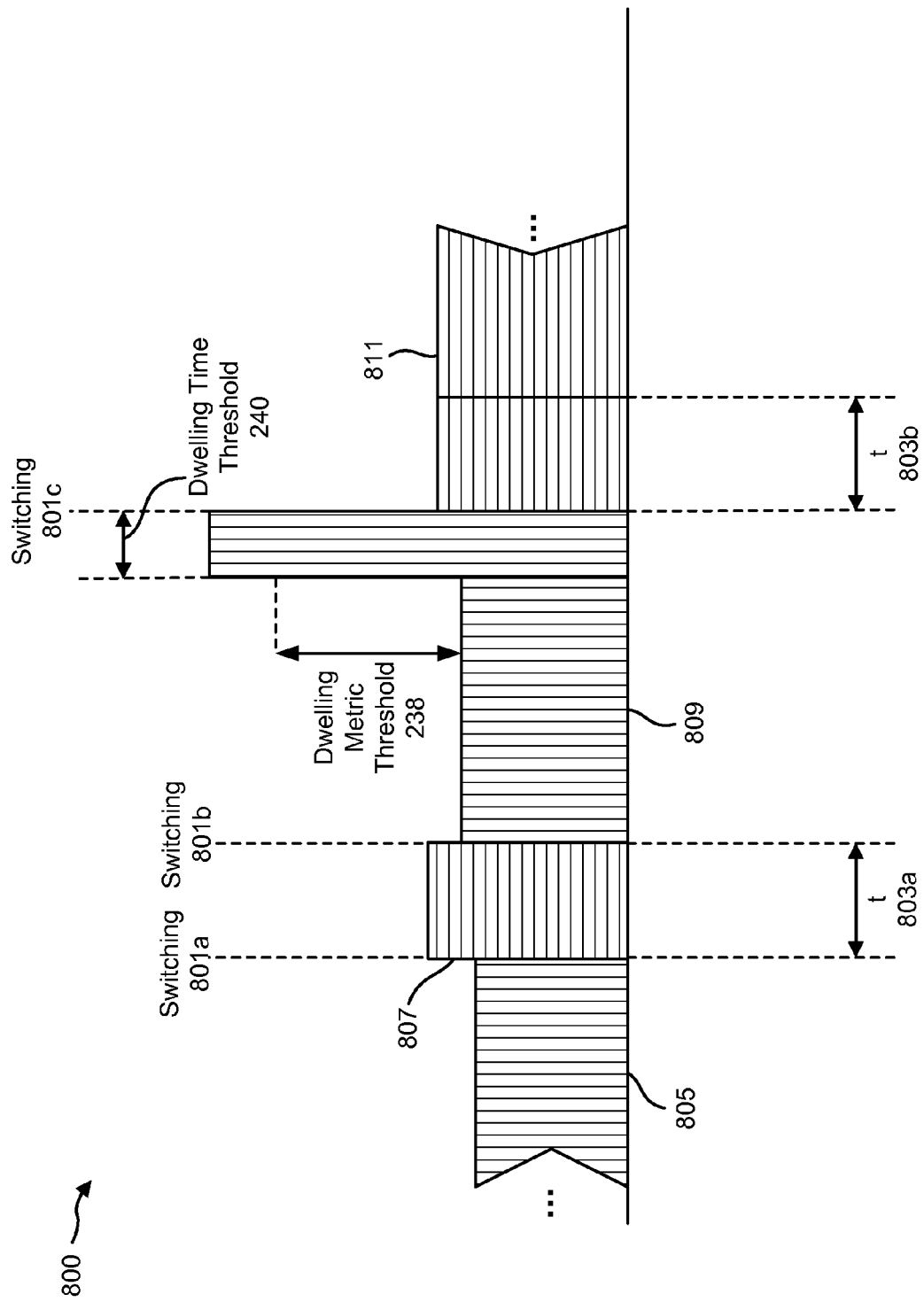

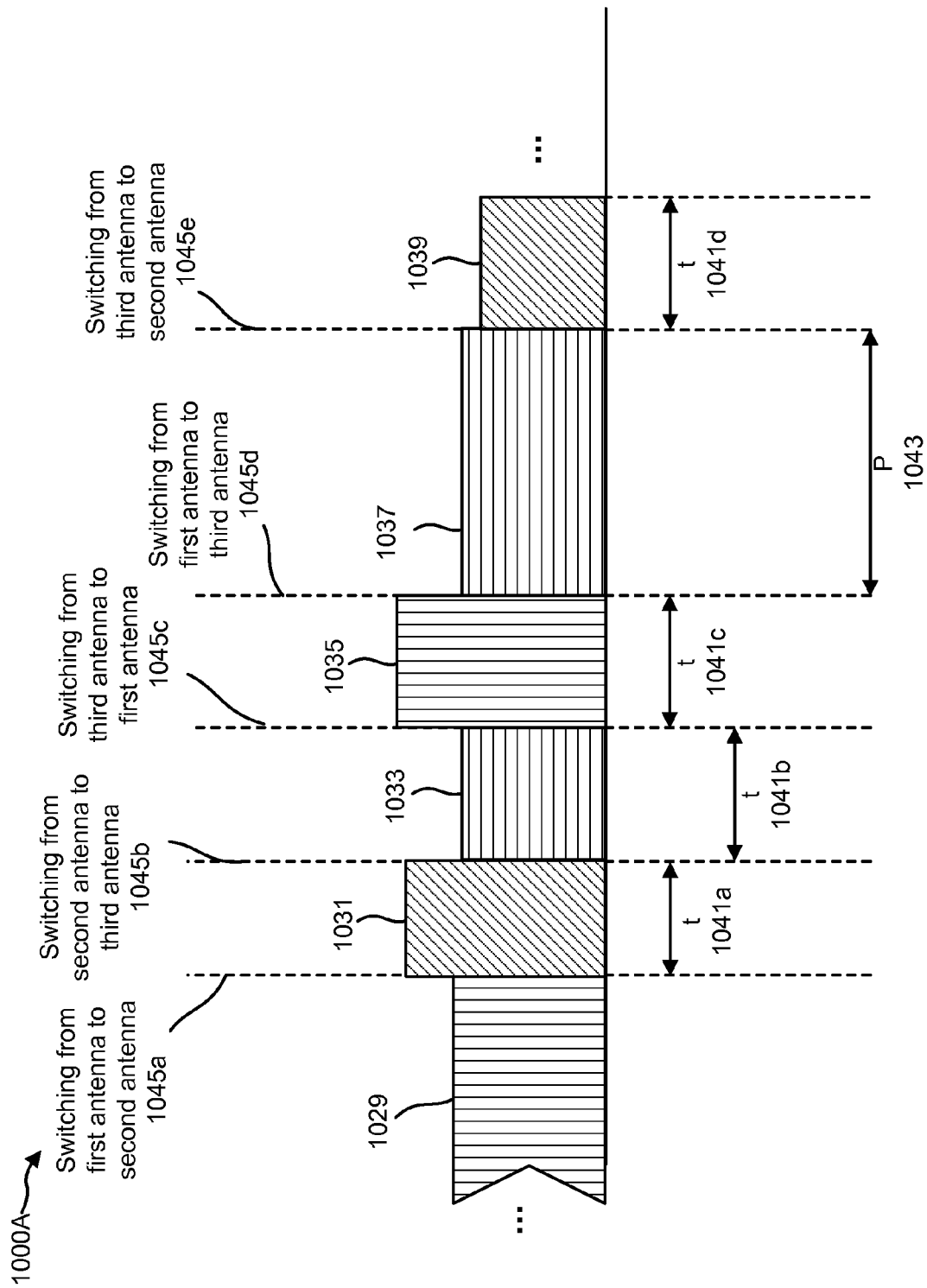

METHODS AND APPARATUS FOR POWER CONTROL BASED ANTENNA SWITCHING

TECHNICAL FIELD

The present disclosure relates generally to wireless communication systems. More specifically, the present disclosure relates to systems and methods for power control based antenna switching.

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers, and the like. Consumers have come to expect reliable service, expanded areas of coverage, and increased functionality. A wireless communication device may be referred to as a mobile station, a subscriber station, an access terminal, a remote station, a user terminal, a terminal, a subscriber unit, user equipment, etc. The term "mobile device" will be used herein.

A wireless communication system may provide communication for a number of cells, each of which may be serviced by a base station. A base station may be a fixed station that communicates with mobile stations. A base station may alternatively be referred to as an access point or some other terminology.

A mobile device may communicate with one or more base stations via transmissions on the uplink and the downlink. The uplink (or reverse link) refers to the communication link from the mobile device to the base station, and the downlink (or forward link) refers to the communication link from the base station to the mobile device. A wireless communication system may simultaneously support communication for multiple mobile devices.

Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, orthogonal frequency division multiple access (OFDMA) systems, and spatial division multiple access (SDMA).

Wireless communication devices may include multiple antennas. Benefits may be realized by providing improved methods and apparatus for using multiple antennas.

BRIEF DESCRIPTION OF THE DRAWINGS

FIG. 7 is a flow diagram illustrating another method for power control based antenna switching using hypothesis-testing;

FIG. 8 illustrates a timing diagram for another configuration of power control based antenna switching using hypothesis-testing;

FIG. 10A illustrates an alternative timing diagram for power control based antenna switching using hypothesis-testing to determine the optimal antenna by a mobile device with three antennas.

DETAILED DESCRIPTION

Figure 1:
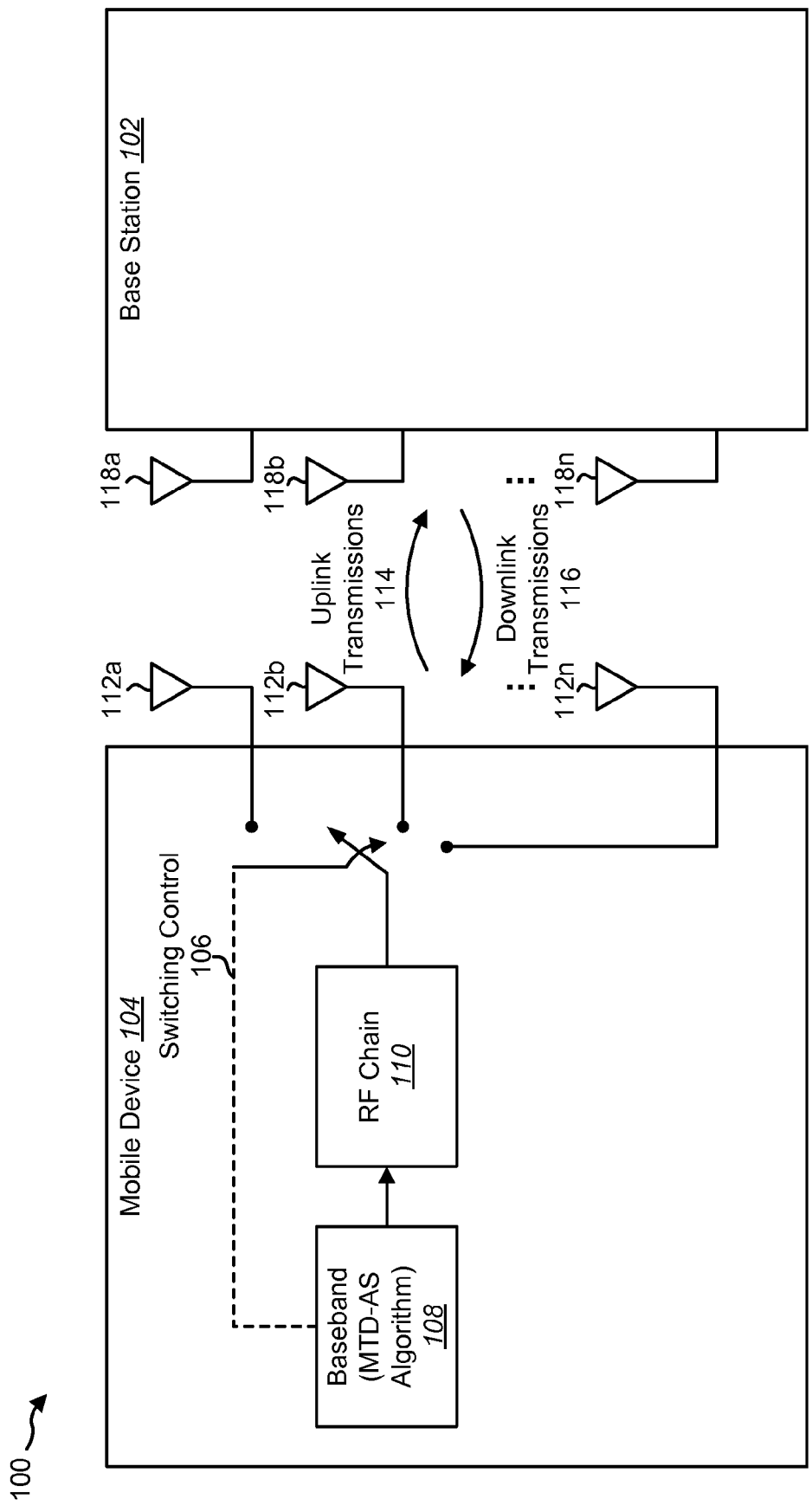
FIG. 1 illustrates a system including a mobile device in wireless communication with a base station.

A method for selecting an antenna is described. A first antenna with a first metric and a radio frequency (RF) chain transmits for a first dwelling period. The method also includes switching to transmitting using a second antenna with a second metric for a first testing period. The second antenna uses the same RF chain as the first antenna. The first metric is compared with the second metric to determine an optimal antenna. The optimal antenna is selected.

The first metric may include a transmission pilot power for the first antenna, and the second metric may include a transmission pilot power for the second antenna. The first metric may also include a total transmission power for the first antenna, and the second metric may include a total transmission power for the second antenna. The first metric may further include a received signal information measurement for the first antenna, and the second metric may further include a received signal information measurement for the second antenna.

A power control bit may be received from a base station. The first metric may be adjusted according to the received power control bit. The second metric may be adjusted according to the received power control bit. The optimal antenna may be used for transmitting for a second dwelling period before beginning a second testing period.

The first testing period may be prematurely ended if the second metric is worse than the first metric by a testing threshold. The first dwelling period may also be prematurely ended if the first metric is worse by more than a dwelling metric threshold for a dwelling time threshold. The first dwelling period may be adapted according to channel variations. The first dwelling period may be increased by a dwelling period extension scaling factor if the first antenna is consecutively selected as the optimal antenna and the first dwelling period is not a maximum dwelling period. The first dwelling period may be decreased by a dwelling period reduction scaling factor if a different antenna was selected as the optimal antenna for the previous dwelling period, and the first dwelling period is not a minimum dwelling period.

Selecting the optimal antenna may include selecting an antenna with a better metric. The RF chain may include a single power amplifier. The RF chain may also include a digital-to-analog convertor (DAC), a radio frequency (RF) mixer, a driver amplifier, and a single power amplifier.

A wireless device configured for selecting an antenna is described. The wireless device includes a processor and memory in electronic communication with the processor. The wireless device also includes instructions stored in the memory. The instructions are executable by the processor to transmit using a first antenna with a first metric and a radio frequency (RF) chain for a first dwelling period. The instructions are also executable to switch to transmitting using a second antenna with a second metric for a first testing period. The second antenna uses the same RF chain as the first antenna. The instructions are further executable to compare the first metric with the second metric to determine an optimal antenna. The instructions are also executable to select the optimal antenna.

An apparatus that is configured for selecting an antenna is also described. The apparatus includes means for transmitting using a first antenna with a first metric and a radio frequency (RF) chain for a first dwelling period. The apparatus also includes means for switching to transmitting using a second antenna with a second metric for a first testing period. The second antenna uses the same RF chain as the first antenna. The apparatus further includes means for comparing the first metric with the second metric to determine an optimal antenna. The apparatus also includes means for selecting the optimal antenna.

A computer-program product for selecting an antenna is described. The computer-program product includes a computer-readable medium having instructions thereon. The instructions include code for transmitting using a first antenna with a first metric and a radio frequency (RF) chain for a first dwelling period. The instructions also include code for switching to transmitting using a second antenna with a second metric for a first testing period. The second antenna uses the same RF chain as the first antenna. The instructions further include code for comparing the first metric with the second metric to determine an optimal antenna. The instructions also include code for selecting the optimal antenna.

FIG. 1 illustrates a system 100 including a mobile device 104 in wireless communication with a base station 102. The base station 102 may be a fixed station that communicates with multiple mobile devices 104. The mobile device 104 may be a mobile station such as a mobile phone, a wireless networking card, a laptop, a portable electronic device capable of wireless communications, etc.

The base station 102 may communicate with each of the mobile devices 104. For example, the base station 102 may send communications to a mobile device 104 over a downlink transmission 116. Similarly, the mobile device 104 may send communications to the base station 102 over an uplink transmission 114. A base station 102 may have one or more antennas 118 (118a-118n).

Multiple mobile devices 104 may be in communication with a single base station 102 or with multiple base stations (not shown) but only one serving base station 102 at any given time. Accordingly, the base station 102 may be designed to receive transmissions from more than one mobile device 104 during the same time frame. Such communications may be referred to as parallel transmissions in the uplink direction 114.

The mobile device 104 and the base station 102 may use a variety of technologies for wireless communications. In one configuration, the mobile device 104 and the base station 102 may use code division multiple access (CDMA) or Wideband Code Division Multiple Access (W-CDMA) as the access technology for communications. A base station 102 employing either CDMA or W-CDMA may use power control to control the transmit power of a mobile device 104. In power control, the base station 102 may send a power control bit (shown in FIG. 2) in each slot of a frame to a mobile device 104. For example, a frame that includes fifteen slots may have fifteen power control bits. A power control bit may instruct the mobile device 104 to increase or decrease the transmit power of the mobile device 104 for uplink transmissions 114. For example, the power control bit may instruct the mobile device 104 to incrementally increase the transmit power by 1 decibel (dB).

The mobile device 104 may send uplink transmissions 114 to the base station 102 using an antenna 112 with a certain transmission power. For example, the mobile device 104 may send transmissions to the base station 102 using the antenna 112 with a transmission power of 0 dBm (power ratio in dB of the measured power referenced to one milliwatt (mW)). In other words, the radiated power from the antenna 112 may be 1 mW.

The base station 102 may instruct the mobile device 104 to increase the transmit power if the signal strength received by the base station 102 is insufficient. For example, losses between the mobile device 104 and the base station 102 may be such that additional transmit power by the mobile device 104 is needed. Likewise, the base station 102 may instruct the mobile device 104 to decrease the transmit power if the signal strength received by the base station 102 is greater than necessary.

A mobile device 104 may include more than one antenna 112 (112a-112n). For example, a mobile device 104 may include two antennas 112 used to send communications to the base station 102 and/or receive communications from the base station 102. In one configuration the mobile device 104 may transmit communications to the base station 102 using only one antenna 112 at a time. For example, a first antenna 112a on the mobile device 104 may be switched off for transmission but remain switched on for receiving while a second antenna 112b on the mobile device 104 may send and receive communications with the base station 102.

The antennas 112 on the mobile device 104 may share the same radio frequency (RF) chain 110 used for transmissions. The RF chain 110 is discussed in further detail below in relation to FIG. 2. The RF chain 110 may receive a signal for transmission from a baseband 108. The baseband 108 may use a mobile transmit diversity-antenna switching (MTD-AS) algorithm. An MTD-AS algorithm may provide switching control 106 for the antennas 112 of the mobile device 104. For example, the MTD-AS algorithm may switch to a different antenna 112 for transmissions whenever such a switch may increase performance. Because the base station 102 may already use power control, additional feedback from the base station 102 may not be required for MTD-AS. Furthermore, the use of MTD-AS may be transparent to the base station 102, such that no changes to the base station 102 may be needed in order for a mobile device 104 to use an MTD-AS algorithm.

Antennas 112 on the mobile device 104 may have the same structure and configuration, or they 112 may have different structures and configurations. In one configuration, each antenna 112 on the mobile device 104 may have the same gain. Each antenna 112 on the mobile device 104 may be located in a different position on the mobile device 104. For example, the first antenna 112a may be located at one end of the mobile device 104 and the second antenna 112b may be located at the opposite end of the mobile device 104. Thus, transmissions from each antenna 112 may follow a different transmission path from the mobile device 104 to the base station 102. For example, transmissions from the first antenna 112a may be interfered with by the hand or body of a user of the mobile device 104. Transmissions from the second antenna 112b may not be interfered with by the hand or body of a user of the mobile device 104, allowing transmissions from the second antenna 112b to be received by the base station 102 with a higher signal strength compared to transmissions received by the base station 102 from the first antenna 112a.

The use of an MTD-AS algorithm may allow the mobile device 104 to determine the optimal antenna 112 to select in a mobile transmit diversity scheme. For example, MTD-AS may have the luxury of switching to a better performing antenna 112 when possible or when desired. MTD-AS may also be more robust in detrimental situations such as fading and hand/body blockage, due to the capability of the mobile device 104 to resort to backup antennas 112.

Figure 2:
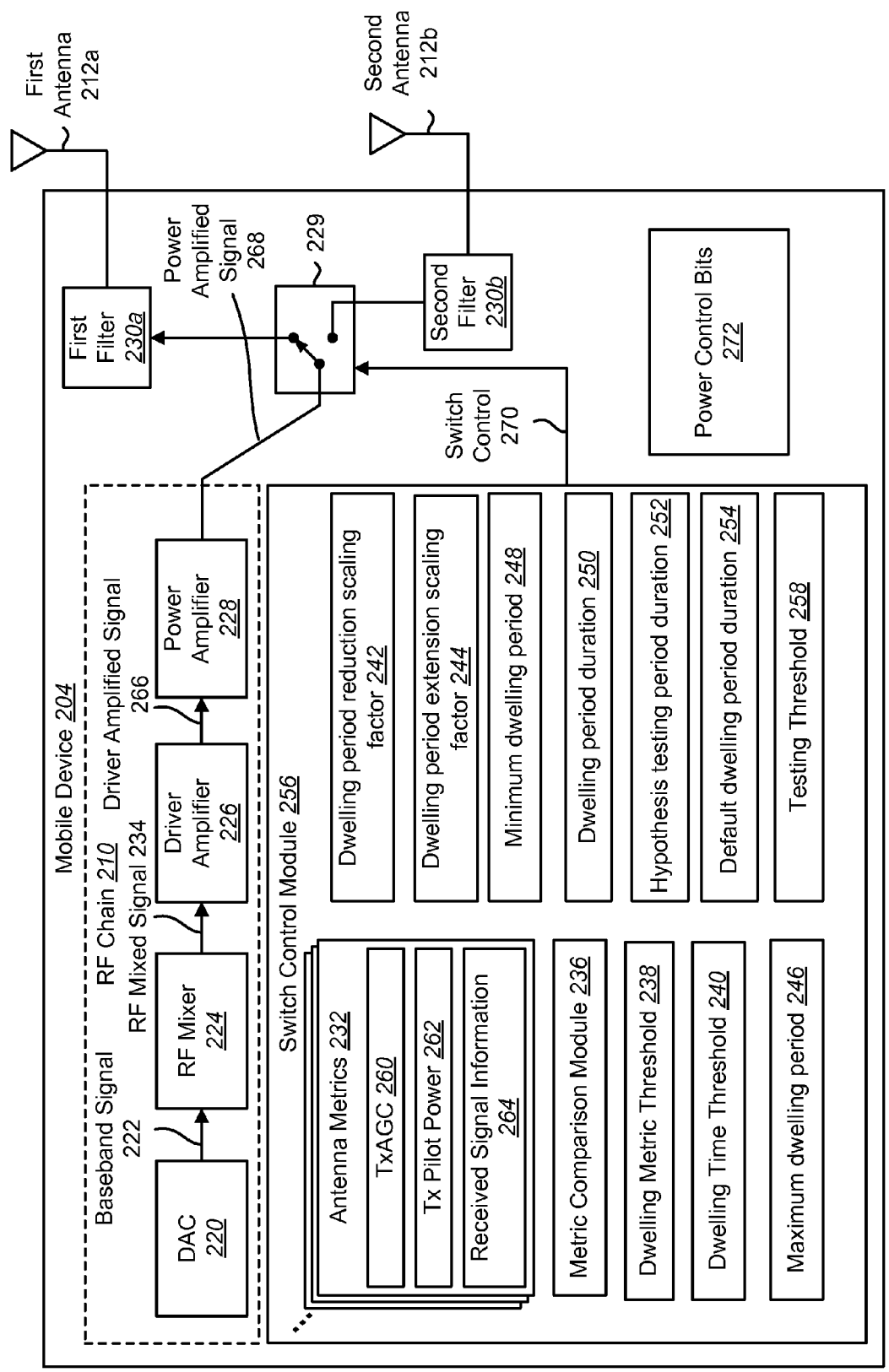
FIG. 2 is a block diagram illustrating components of a mobile device for use in the present methods and apparatus.

FIG. 2 is a block diagram illustrating components of one configuration of a mobile device 204 for use in the present methods and apparatus. As discussed above in relation to FIG. 1, a mobile device 204 with multiple antennas 212a, 212b may have an RF chain 210 for transmission of a signal. The RF chain 210 may include a digital-to-analog convertor (DAC) 220 which outputs a baseband signal 222 to an RF mixer 224. The RF mixer 224 may upconvert the baseband signal 222 to the transmit frequency. The output of the RF mixer 224 may be an RF mixed signal 234. The RF mixed signal 234 may then be amplified with a driver amplifier 226 to produce a driver amplified signal 266. The driver amplified signal 266 may be amplified by a power amplifier 228 to produce a power amplified signal 268. In other diversity schemes, multiple RF chains 210 with multiple power amplifiers 228 may be used. In MTD-AS, only a single RF chain 210 with a single power amplifier 228 may be necessary, adding an advantage of simplicity to MTD-AS.

A switch 229 may then determine which antenna 212 will transmit the power amplified signal 268. The switch 229 may be controlled by a switch control module 256 using a switch control 270. If the first antenna 212a is selected, the signal 222 may be filtered prior to transmission using a first filter 230a. The first filter 230a may be an International Mobile Telecommunications (IMT) duplexer. Likewise, if the second antenna 212b is selected, the signal 222 may be filtered prior to transmission using a second filter 230b. An IMT duplexer may be necessary for each band where MTD (mobile transmit diversity) is desired. In other words, a filter 230 may be required for each band for each antenna 212 used by the mobile device 204. The second filter 230b may be an IMT duplexer.

The switch control module 256 may determine when to switch between antennas 212. The switch control module 256 may include one or more metrics 232 for transmission for each of the antennas 212. The switch control module 256 may include metrics 232 for the first antenna and metrics 232 for the second antenna. Additional metrics may be used for additional antennas. For example, a metric 232 for transmission may be the total power used by the antenna 212, TxAGC 260. A metric 232 for transmission may also be the transmit pilot power, Tx Pilot Power 262. Tx pilot power 262 may represent the channel between each antenna 212 and the base station 102. A metric 232 for transmission may also include received signal information 264 such as the total received power used by the antenna 212.

The switch control module 256 may also include a metric comparison module 236. The metric comparison module 236 may assist the switch control module 256 in determining the optimal antenna 212 based on the metrics of each antenna.

The switch control module 256 may include a dwelling period duration 250 and a hypothesis testing period duration 252. The hypothesis testing period duration 252 may be a preset amount of time for which hypothesis testing occurs by default. Alternatively, the hypothesis testing period duration 252 may be shorter whenever the antenna metrics 232 are distinguished enough for the metric comparison module 236 to determine the optimal antenna 212 for transmission. Alternatively still, the hypothesis testing period duration 252 may be longer whenever the antenna metrics 232 are not distinguished enough for the metric comparison module 236 to determine the optimal antenna 212 for transmission. Hypothesis testing is discussed in further detail below in relation to FIG. 3. The dwelling period duration 250 may be the amount of time that the switch control module 256 will use an antenna 212 for uplink transmission 114 before returning to hypothesis testing. The dwelling period duration 250 may be a preset value. Alternatively, the dwelling period duration 250 may vary according to hypothesis testing conditions. For example, the dwelling period duration 250 may be reduced by a dwelling period reduction scaling factor 242 down to a minimum dwelling period 248 or increased by a dwelling period extension scaling factor 244 up to a maximum dwelling period 246. The dwelling period duration 250 may also be reset to a default dwelling period duration 254. The default dwelling period duration 254 may be a preset value for the dwelling period duration 250.

The switch control module 256 may include a testing threshold 258. The testing threshold 258 may be a preset threshold. The testing threshold 258 may define the maximum increase in transmit power when switching from using a first antenna 212a during a dwelling period to using a second antenna 212b during a hypothesis testing period. If the transmit power of the second antenna 212b is greater than the transmit power of the first antenna 212a in the previous dwelling period by at least the testing threshold 258 during a hypothesis testing period, the switch control module 256 may switch from using the second antenna 212b to using the first antenna 212a for a dwelling period.

The switch control module 256 may include a dwelling metric threshold 238 and a dwelling time threshold 240. The dwelling metric threshold 238 may define the maximum amount of increase to the transmit power of an antenna 212 during a dwelling period before a hypothesis testing period is automatically triggered. A hypothesis testing period may be automatically triggered if the transmit power of an antenna 212 remains above the average transmit power of the antenna 212 over the current dwelling period by at least the dwelling metric threshold 238 for an amount of time referred to as the dwelling time threshold 240.

As discussed above in relation to FIG. 1, the mobile device 204 may include received power control bits 272. The mobile device may receive the power control bits 272 from a base station 102. Power control bits 272 may instruct the mobile device 204 to adjust the antenna metrics 232 for an antenna 212.

Figure 3:
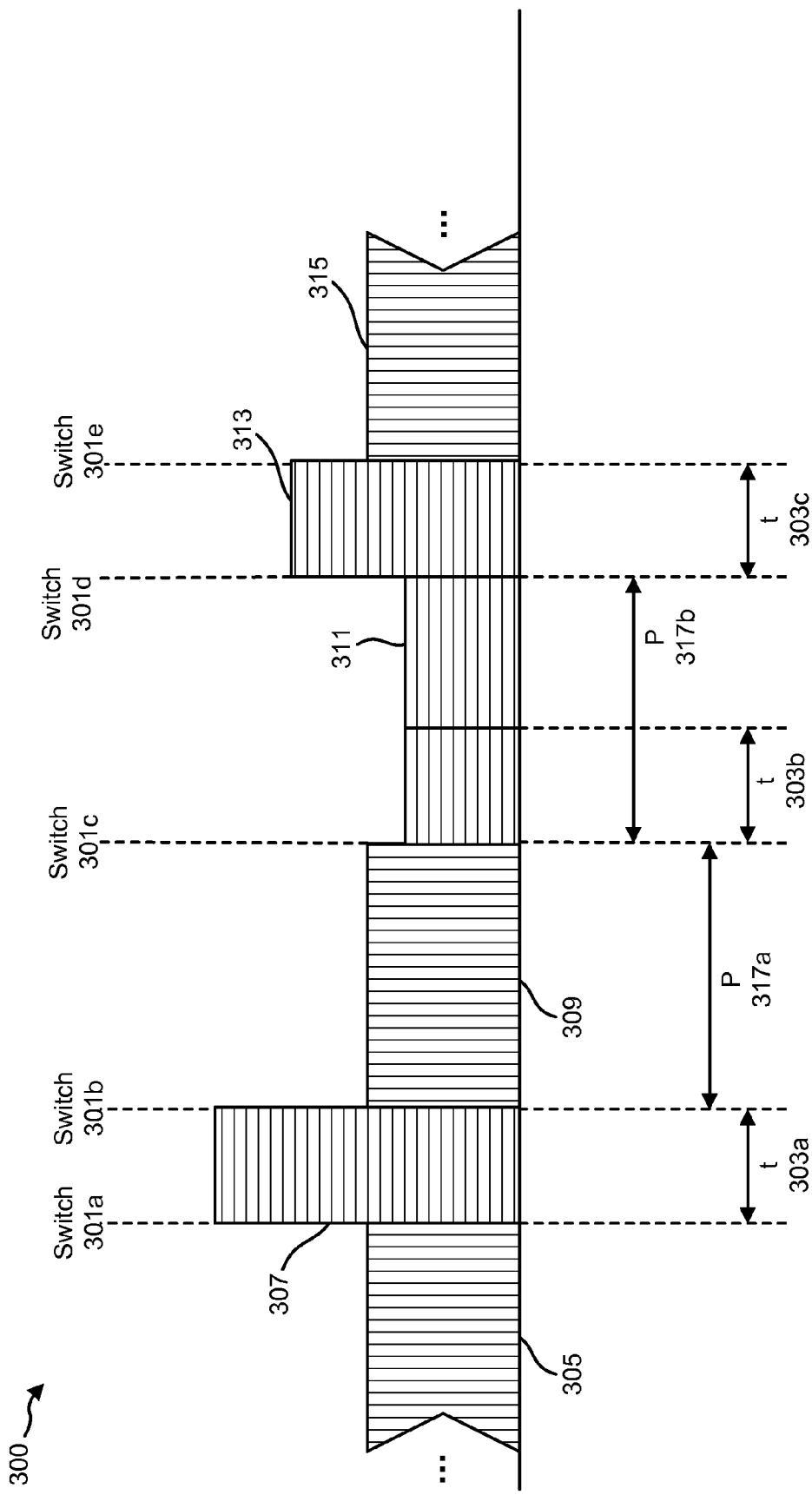
FIG. 3 illustrates a timing diagram for power control based hypothesis-testing to determine the optimal antenna by a mobile device.

FIG. 3 illustrates a timing diagram 300 for power control based hypothesis-testing to determine the optimal antenna 112 by a mobile device 104. The mobile device 104 may send 305 transmissions to a base station 102 using a first antenna 112a. The mobile device 104 may then switch 301a to sending 307 transmissions to the base station 102 using a second antenna 112b for a hypothesis testing period 303a. The testing period 303 may have a duration of the hypothesis testing period duration 252 and may be referred to by t. In a testing period 303, the mobile device 104 may test whether using an alternative antenna 112 may be beneficial. As discussed above in relation to FIG. 1, the mobile device 104 may receive power control bits 272 from the base station 102 that indicate whether the mobile device 104 is to increase the transmit power or decrease the transmit power.

The transmit power for the second antenna 112b may be greater than the transmit power for the first antenna 112a from the previous dwelling period. For example, the transmit path from the second antenna 112b to the base station 102 may include additional propagation losses compared to the transmit path from the first antenna 112a to the base station 102. The base station 102 may send power control bits 272 to the mobile device 104 indicating that the mobile device 104 is to raise the transmit power for the second antenna 112b. If the transmit power for the second antenna 112b from the testing period 303a is greater than the transmit power for the first antenna 112a from the previous dwelling period, the mobile device 104 may switch 301b back to transmitting 309 using the first antenna 112a. The mobile device 104 may then transmit 309 using the first antenna 112a for a dwelling period 317a (P). The dwelling period duration 250 may be a predefined amount of time.

Once the dwelling period 317a has elapsed, the mobile device 104 may switch 301c to transmitting 311 using the second antenna 112b. The mobile device 104 may switch 301c to transmitting 311 using the second antenna 112b for a testing period 303b. If the transmit power for the second antenna 112b from the testing period 303b is less than the transmit power for the first antenna 112a from the previous dwelling period 317a, the mobile device 104 may continue transmitting 311 using the second antenna 112b. The mobile device 104 may transmit 311 using the second antenna 112b for a dwelling period 317b. The dwelling period 317b may begin when the mobile device 104 first switches 301c to transmitting 311 using the second antenna 112b. Thus, the dwelling period 317b and the testing period 303b may run concurrently. Alternatively, the dwelling period 317b may begin at the end of the hypothesis testing period 303b.

At the end of the dwelling period 317b, the mobile device 104 may switch 301d from transmitting 311 using the second antenna 112b to transmitting 313 using the first antenna 112a. After a testing period 303c, the mobile device 104 may again compare the transmit power used for the first antenna 112a with the transmit power used for the second antenna 112b. If the transmit power for the second antenna 112b from the previous dwelling period 317b is lower than the transmit power for the first antenna 112a, the mobile device 104 may switch 301e back to transmitting 315 using the second antenna 112b.

Figure 4:
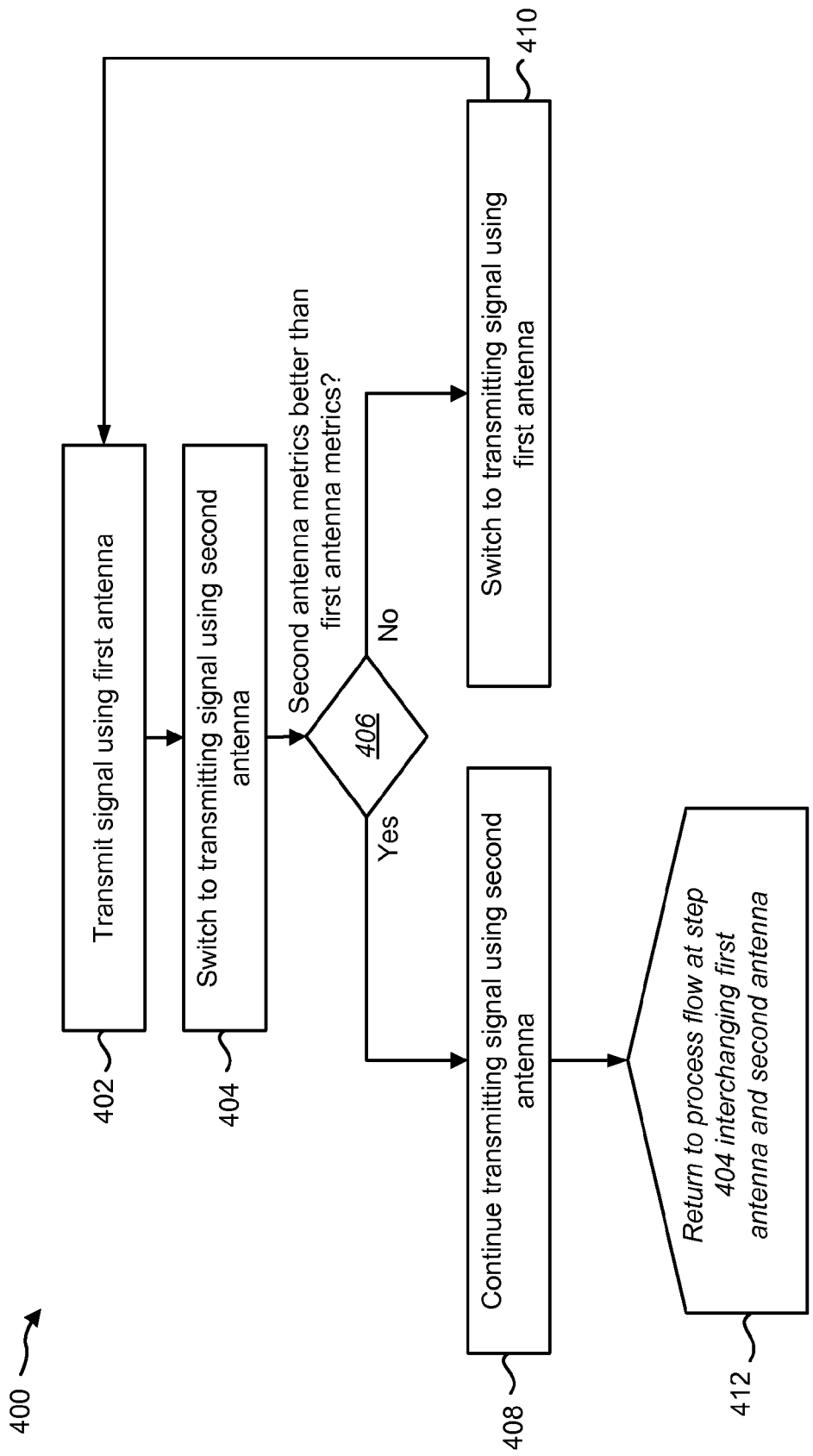
FIG. 4 is a flow diagram illustrating a method for power control based antenna switching using hypothesis-testing.

FIG. 4 is a flow diagram illustrating a method 400 for power control based antenna switching using hypothesis-testing. A mobile device 104 may transmit 402 a signal using a first antenna 112a. The mobile device 104 may then switch 404 to transmitting the signal using a second antenna 112b. The mobile device 104 may determine 406 whether the second antenna metrics 232 are better than the first antenna metrics 232 from a previous dwelling period. Metrics 232 were discussed in further detail above in relation to FIG. 2. If the second antenna metrics 232 are not better than the first antenna metrics 232, the mobile device 104 may switch 410 to transmitting the signal using the first antenna 112a. The mobile device may then transmit 402 the signal using the first antenna 112a. If the second antenna metrics 232 are better than the first antenna metrics 232, the mobile device 104 may continue 408 transmitting using the second antenna and then return 412 to the process flow at step 404 interchanging the first antenna 112a and the second antenna 112b. For example, after interchanging the first antenna 112a and the second antenna 112b, the determination of step 406 would be determining 406 if the first antenna metrics 232 are better than the second antenna metrics 232, step 410 would be switching 410 to transmitting the signal using the second antenna, and so forth. When step 412 was again performed, the first antenna and the second antenna would again be interchanged before returning to the process flow at step 404. Thus, as shown, the process of FIG. 4 may be repeated many times switching back and forth between the two antennas.

Figure 4A:
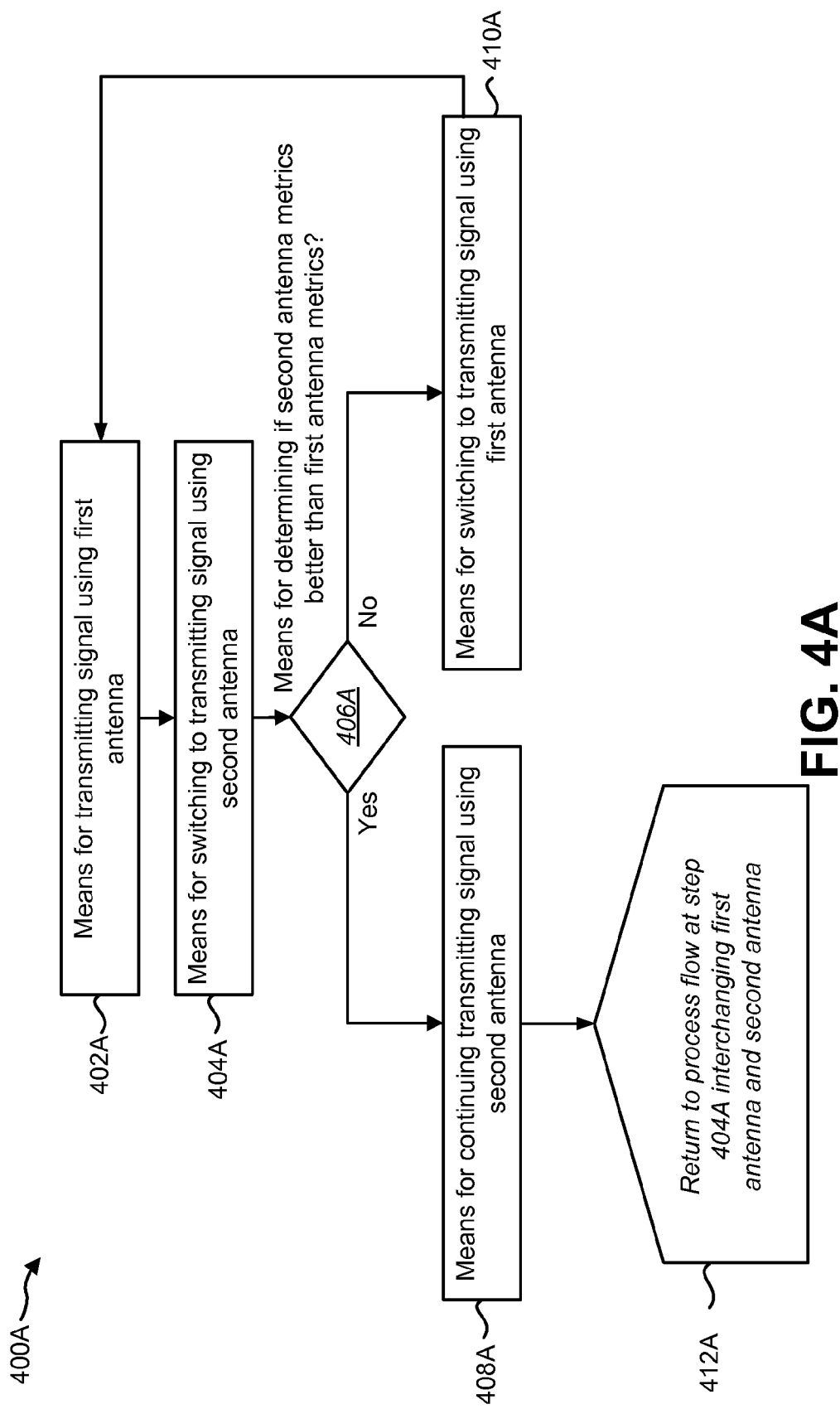
FIG. 4A illustrates means-plus-function blocks corresponding to the method of FIG. 4.

The method 400 of FIG. 4 described above may be performed by various hardware and/or software component(s) and/or module(s) corresponding to the means-plus-function blocks 400A illustrated in FIG. 4A. In other words, blocks 402 through 410 illustrated in FIG. 4 correspond to means-plus-function blocks 402A through 410A illustrated in FIG. 4A.

Figure 5:
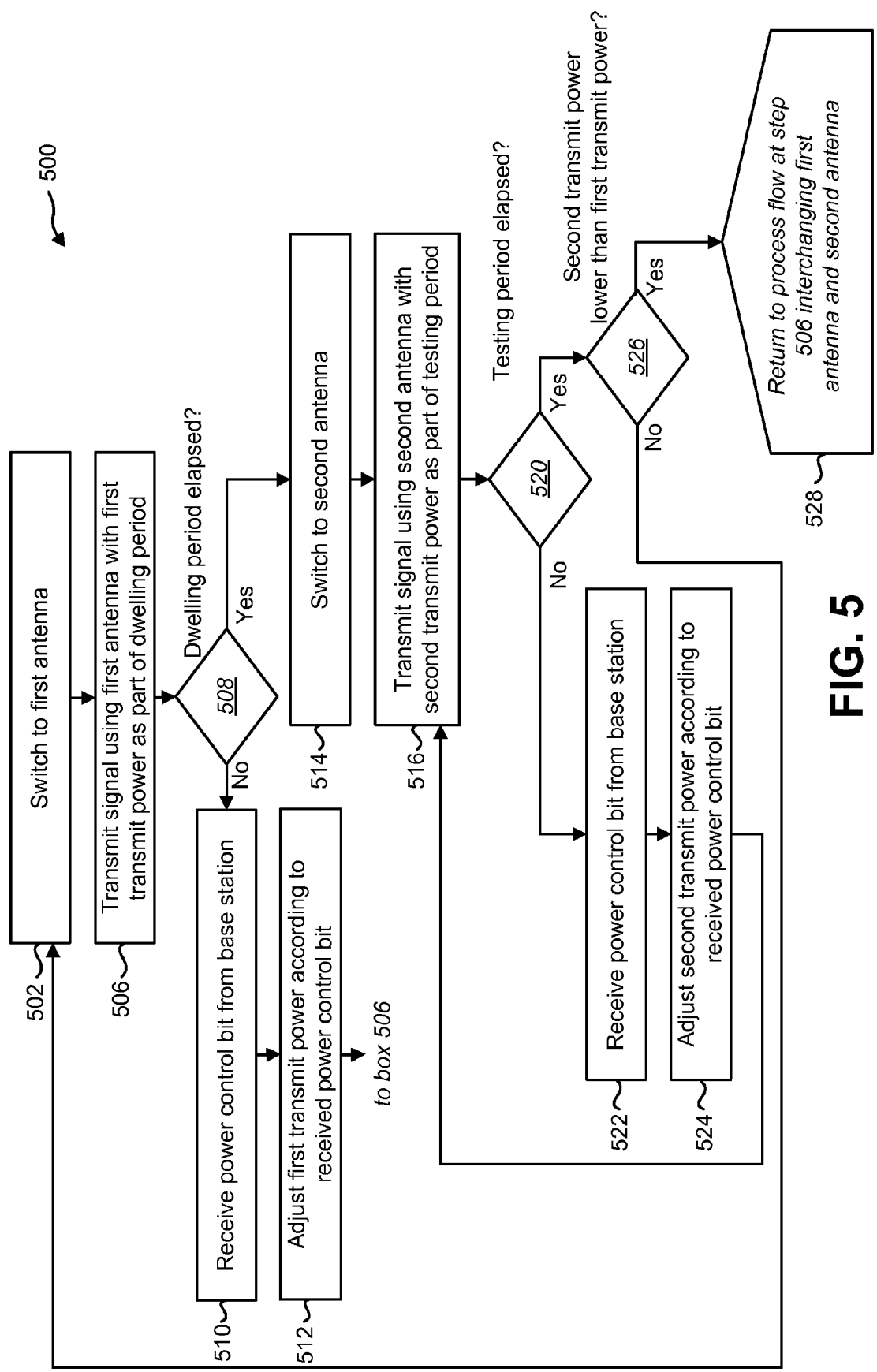
FIG. 5 is a flow diagram illustrating an alternative method for power control based antenna switching using hypothesis-testing.

FIG. 5 is a flow diagram illustrating an alternative method 500 for power control based antenna switching using hypothesis-testing. A mobile device 104 may switch 502 to a first antenna 112a for transmissions. The mobile device 104 may transmit 506 a signal using the first antenna 112a with a first transmit power as part of a dwelling period. The mobile device 104 may transmit 506 the signal to a base station 102. The mobile device 104 may then determine 508 whether the dwelling period has elapsed.

If the dwelling period has not elapsed, the mobile device 104 may receive 510 a power control bit 272 from the base station 102. Power control bits 272 are discussed above in relation to FIG. 2. The mobile device 104 may adjust 512 the first transmit power according to the received power control bit 272. For example, the mobile device 104 may increase or decrease the first transmit power according to the received power control bit 272. The mobile device 104 may then return to transmitting 506 the signal using the first antenna 112a with the first transmit power as part of the dwelling period.

If the dwelling period has elapsed, the mobile device 104 may switch 514 to a second antenna 112b for transmissions. The mobile device 104 may next transmit 516 the signal using the second antenna 112b with a second transmit power as part of a testing period.

The mobile device 104 may determine 520 whether the testing period has elapsed. If the testing period has not elapsed, the mobile device 104 may receive 522 a power control bit 272 from the base station 102. The mobile device 104 may then adjust 524 the second transmit power according to the received power control bit 272. If the testing period has elapsed, the mobile device 104 may determine 526 if the second transmit power is lower than the first transmit power of the previous dwelling period. If the second transmit power is not lower than the first transmit power, the mobile device 104 may switch 502 to the first antenna for transmitting. If the second transmit power is lower than the first transmit power, the mobile device 104 may return 528 to the process flow at step 506 interchanging the first antenna 112a and the second antenna 112b. For example, step 516 would be transmitting 516 the signal using the first antenna 112a with a first transmit power as part of a testing period. Thus, as shown, the process of FIG. 5 may be repeated many times switching back and forth between the two antennas.

Figure 5A:
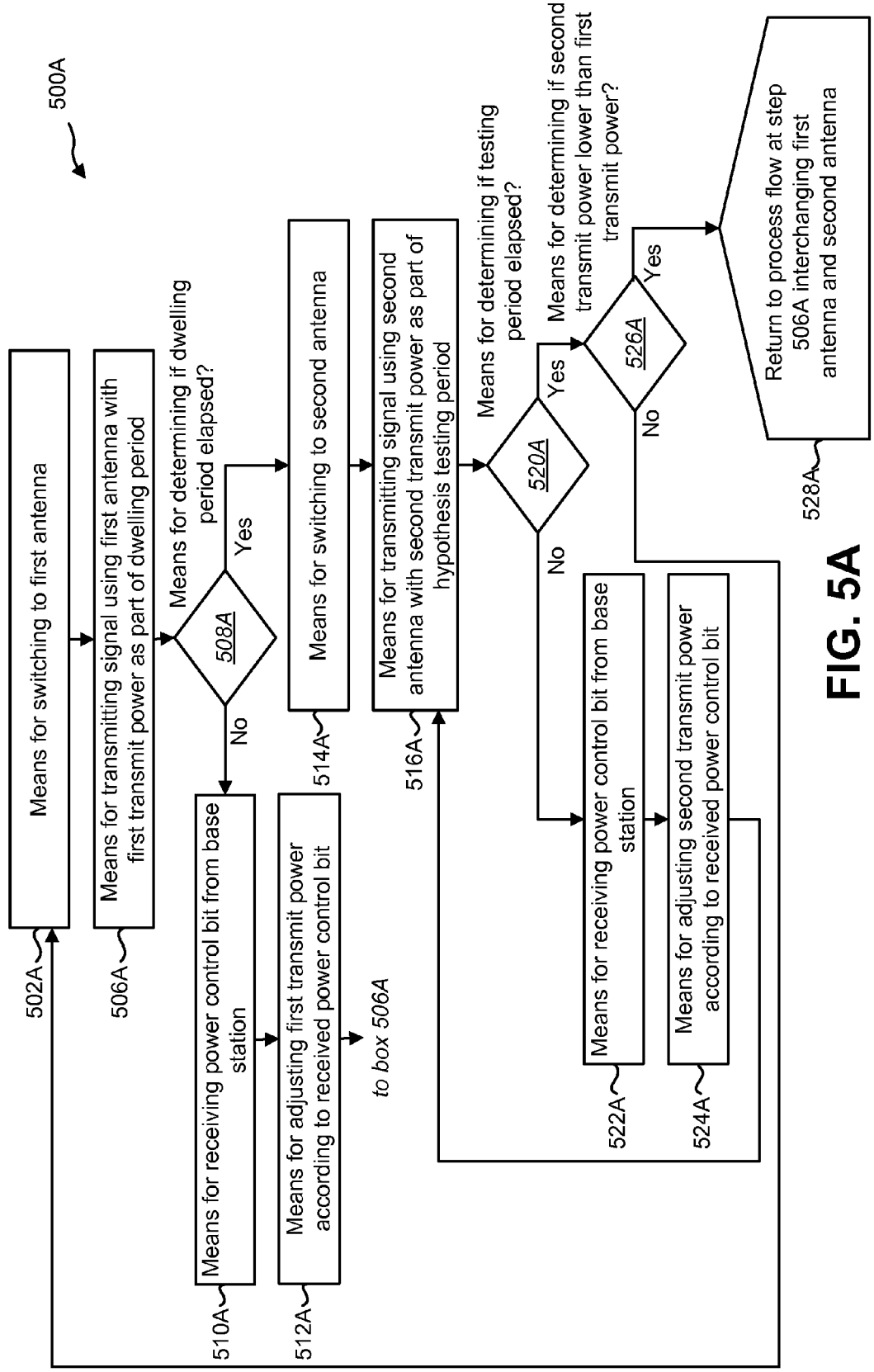
FIG. 5A illustrates means-plus-function blocks corresponding to the method of FIG. 5.

The method 500 of FIG. 5 described above may be performed by various hardware and/or software component(s) and/or module(s) corresponding to the means-plus-function blocks 500A illustrated in FIG. 5A. In other words, blocks 502 through 528 illustrated in FIG. 5 correspond to means-plus-function blocks 502A through 528A illustrated in FIG. 5A.

Figure 6:
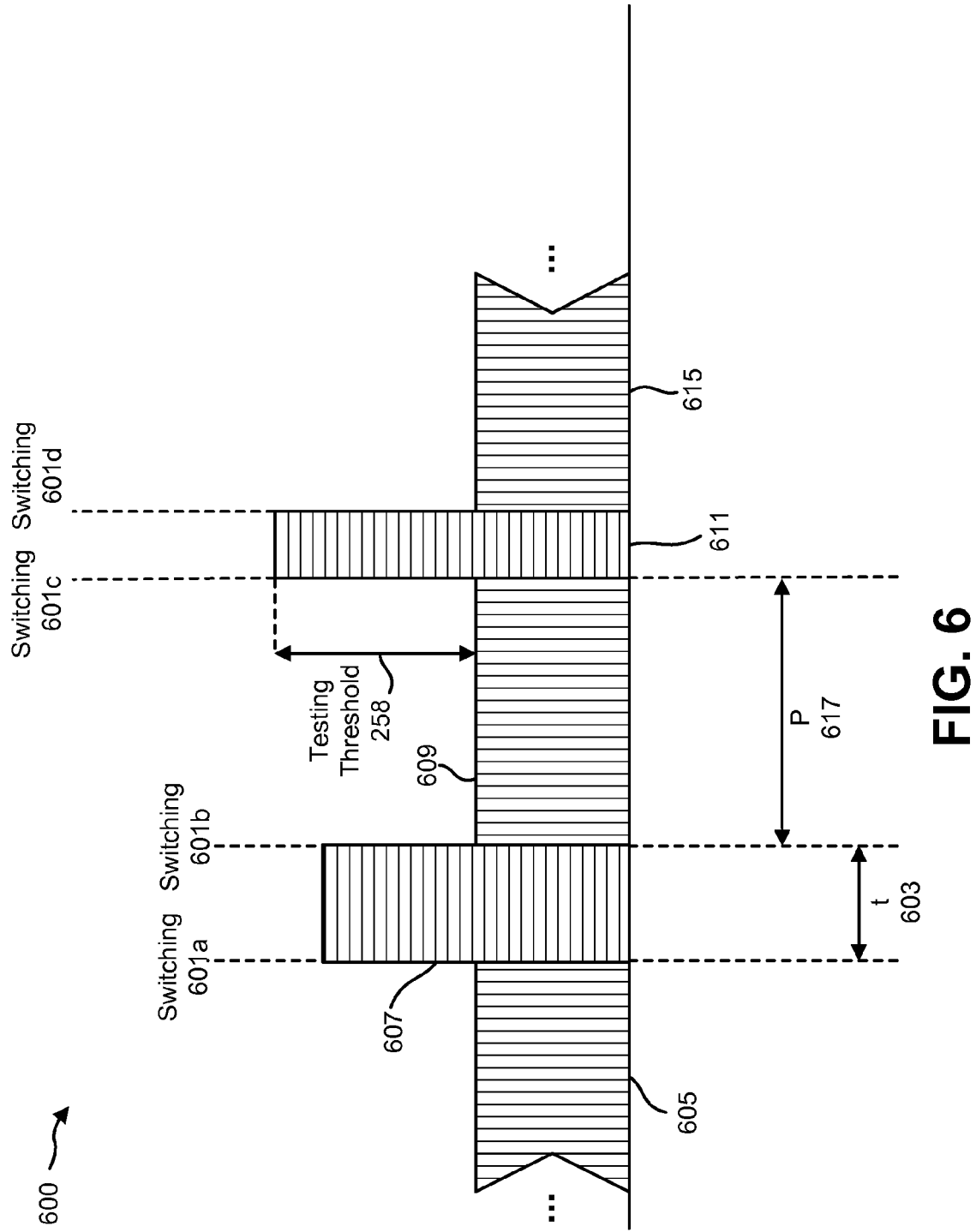
FIG. 6 illustrates a timing diagram for another configuration of power control based antenna switching using hypothesis-testing to determine the optimal antenna by a mobile device.

FIG. 6 illustrates a timing diagram 600 for another configuration of power control based antenna switching using hypothesis-testing to determine the optimal antenna by a mobile device 104. The mobile device 104 may send 605 transmissions to a base station 102 using a first antenna 112a. In another configuration, the present systems and methods may be used with a mobile station communicating directly with another mobile station where a base station is not required. Thus, although examples herein show a base station 102 and a mobile device 104, the present systems and methods may be used in other types of wireless communication systems that may not require a base station 102.

The mobile device 104 may then switch 601a to sending 607 transmissions to the base station 102 using the second antenna 112b for a testing period 603. If the transmit power for the second antenna 112b from the testing period 603 is greater than the transmit power for the first antenna 112a from a previous dwelling period, the mobile device 104 may switch 601b to transmitting 609 using the first antenna 112a. The mobile device 104 may then transmit 609 using the first antenna 112a for a dwelling period 617.

Once the dwelling period 617 has elapsed, the mobile device 104 may switch 601c to transmitting 611 using the second antenna 112b for a testing period. If the testing period has not yet elapsed and the transmit power for the second antenna 112b is greater than the transmit power for the first antenna 112a from the previous dwelling period by a testing threshold 258, the mobile device 104 may switch 601d back to transmitting 615 using the first antenna 112a. The mobile device 104 may switch 601d back to transmitting 615 using the first antenna 112a before the testing period has elapsed.

FIG. 7 is a flow diagram illustrating another method 700 for power control based antenna switching using hypothesis-testing. A mobile device 104 may switch 702 to a first antenna 112a for transmissions. The mobile device 104 may transmit 706 a signal using the first antenna with first antenna metrics 232 as part of a dwelling period. In one configuration, the mobile device 104 may transmit 706 the signal to a base station 102. The mobile device 104 may then determine 708 whether the dwelling period has elapsed.

If the dwelling period has not elapsed, the mobile device 104 may receive 710 a power control bit 272 from the base station 102. The mobile device 104 may adjust 712 the first antenna metrics 232 according to the received power control bit 272. The mobile device 104 may then return to transmitting 706 the signal using the first antenna 112a with the first antenna metrics 232.

If the dwelling period has expired, the mobile device 104 may switch 714 to a second antenna 112b for transmissions. The mobile device 104 may next transmit 716 the signal using the second antenna 112b with second antenna metrics 232 as part of a testing period.

The mobile device 104 may determine 720 whether the testing period has elapsed. If the testing period has not elapsed, the mobile device 104 may determine 721 whether the second antenna metrics 232 are worse than the first antenna metrics 232 from the previous dwelling period by a testing threshold 258. If the second antenna metrics 232 are worse than the first antenna metrics 232 by the testing threshold 258, the mobile device 104 may switch 702 to the first antenna 112a for transmissions.

If the second antenna metrics 232 are not worse than the first antenna metrics 232 by the testing threshold 258, the mobile device 104 may receive 722 a power control bit 272 from the base station 102. The mobile device 104 may then adjust 724 the second antenna metrics 232 according to the received power control bit 272 and return to transmitting 716 the signal using the second antenna 112b with the second antenna metrics 232 as part of the testing period.

If the hypothesis testing period has elapsed, the mobile device 104 may determine 726 if the second antenna metrics 232 are better than the first antenna metrics 232 from the previous dwelling period. If the second antenna metrics 232 are not better than the first antenna metrics 232, the mobile device may switch 702 to the first antenna 112a for transmitting. If the second antenna metrics 232 are better than the first antenna metrics 232, the mobile device 104 may return 728 to the process flow at step 706 interchanging the first antenna 112a and the second antenna 112b. For example, step 716 would be transmitting 716 the signal using the first antenna 112a with first antenna metrics as part of a testing period. Thus, as shown, the process of FIG. 7 may be repeated many times switching back and forth between the two antennas.

Figure 7A:
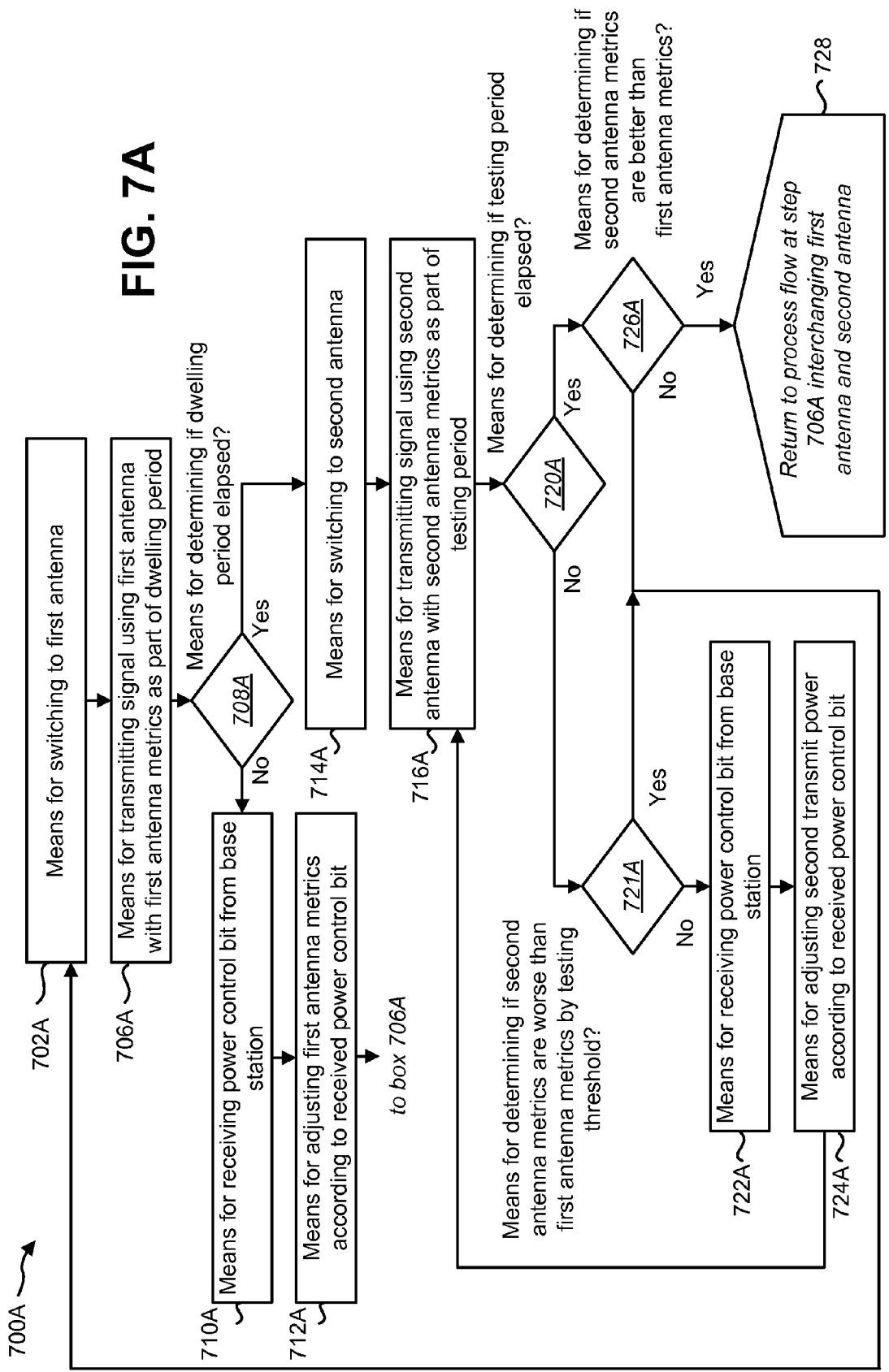
FIG. 7A illustrates means-plus-function blocks corresponding to the method of FIG. 7.

The method 700 of FIG. 7 described above may be performed by various hardware and/or software component(s) and/or module(s) corresponding to the means-plus-function blocks 700A illustrated in FIG. 7A. In other words, blocks 702 through 728 illustrated in FIG. 7 correspond to means-plus-function blocks 702A through 728A illustrated in FIG. 7A.

FIG. 8 illustrates a timing diagram 800 for another configuration of power control based antenna switching using hypothesis-testing. A mobile device 104 may transmit 805 a signal using a first antenna 112a with a first transmit power to a base station 102. The mobile device 104 may then switch 801a to a second antenna 112b for transmissions 807 to the base station 102 as part of a testing period 803a. The mobile device 104 may transmit 807 the signal using the second antenna 112b with a second transmit power. The mobile device 104 may transmit 807 the signal using the second antenna 112b for the duration of the testing period 803a. At the end of the testing period 803a, the mobile device 104 may compare the first transmit power from a previous dwelling period with the second transmit power. If the second transmit power is greater than the first transmit power, the mobile device 104 may switch 801b to the first antenna 112a for transmissions 809 to the base station as part of a dwelling period.

During the transmission 809 of the signal by the first antenna 112a as part of a dwelling period, the mobile device 104 may receive power control bits 272 from the base station 102. Based on the power control bits 272, the first transmit power for the first antenna 112a may increase. If the first transmit power increases by more than a dwelling metric threshold 238 for a dwelling time threshold 240, the dwelling period may be prematurely ended. The mobile device 104 may switch 801c to the second antenna 112b for transmissions 811 to the base station as part of a testing period 803b. The mobile device 104 may transmit 811 the signal using the second antenna 112b for the duration of the testing period 803b. At the end of the testing period 803b, the mobile device 104 may compare the first transmit power for the first antenna 112a from the previous dwelling period with the second transmit power for the second antenna 112b. If the first transmit power is greater than the second transmit power, the mobile device 104 may continue transmitting 811 the signal using the second antenna 112b.

Figure 9:
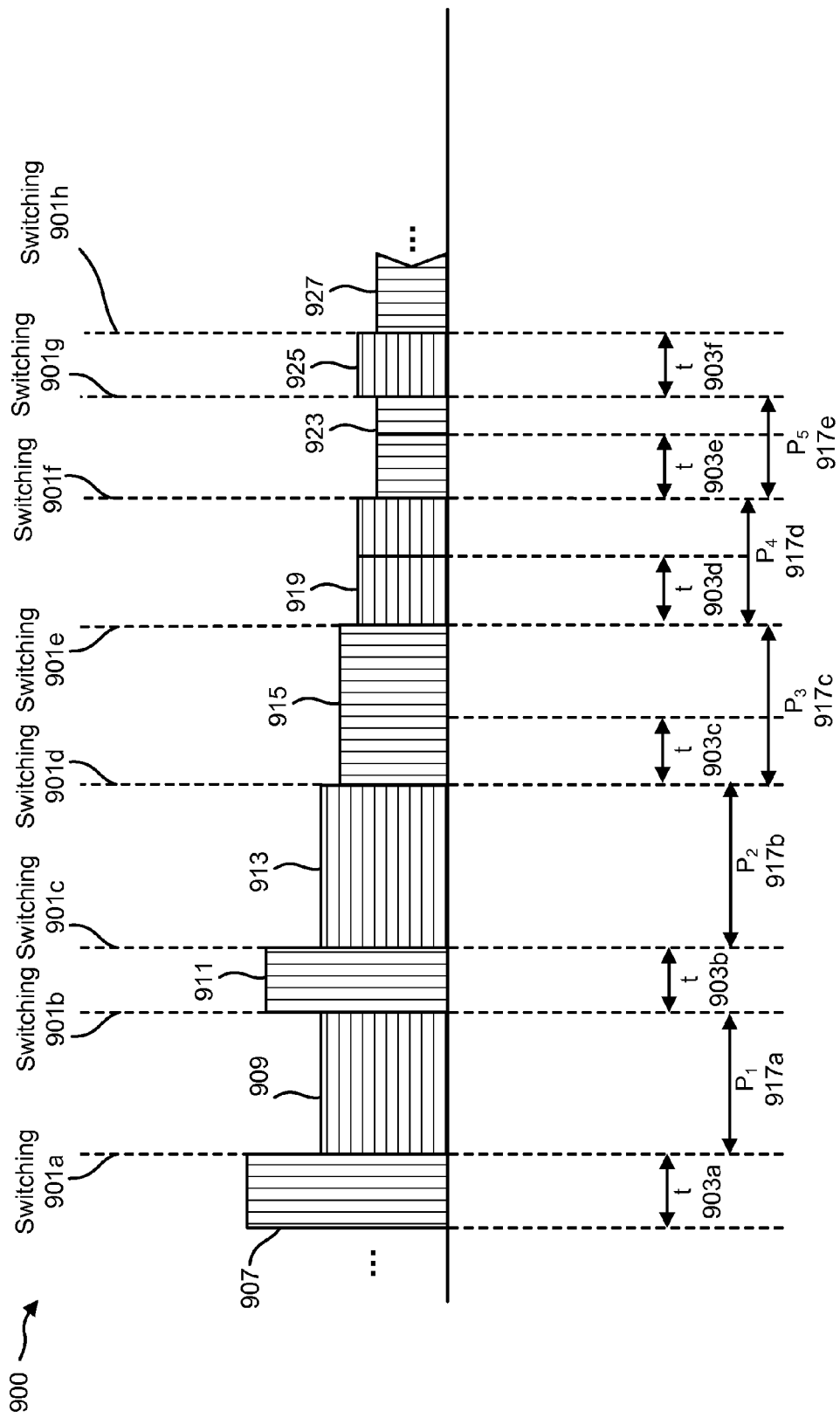
FIG. 9 illustrates a timing diagram of a configuration for increasing and decreasing dwelling period durations as part of a system for power control based antenna switching using hypothesis-testing.

FIG. 9 illustrates a timing diagram 900 of a configuration for increasing and decreasing dwelling period durations 250 as part of a system for power control based antenna switching using hypothesis-testing. A dwelling period duration 250 may depend on the number of consecutive times that an antenna 112 has been selected as the optimal antenna. The dwelling period duration 250 may also depend on the number of consecutive dwelling periods 917 where a different antenna 112 is selected as the optimal antenna.

A mobile device 104 may send 907 transmissions to a base station 102 using a second antenna 112b during a testing period 903a. Once the testing period 903a has elapsed, the mobile device 104 may compare the transmit power for the second antenna 112b with the transmit power of a first antenna 112a from a previous dwelling period and select the antenna 112 with the lower transmit power as the optimal antenna. If the transmit power for the first antenna 112a is lower than the transmit power for the second antenna 112b, the mobile device 104 may select the first antenna 112a as the optimal antenna. The mobile device 104 may switch 901a to using the first antenna 112a. The mobile device 104 may then transmit 909 the signal using the first antenna 112a as part of a first dwelling period $P_1$ 917a. The duration of the first dwelling period 917a may be the default dwelling period duration 254.

Once the first dwelling period $P_1$ 917a has elapsed, the mobile device 104 may switch 901b to transmitting 911 the signal using the second antenna 112b as part of a testing period 903b. Once the testing period 903b has elapsed, the mobile device 104 may again compare the transmit power of the second antenna 112b with the transmit power of the first antenna 112a from the first dwelling period $P_1$ 917a to determine the optimal antenna. If the transmit power of the first antenna 112a is again lower than the transmit power of the second antenna 112b, the first antenna 112a may again be selected as the optimal antenna. The mobile device 104 may switch 901c back to using the first antenna 112a. The mobile device 104 may then transmit 913 the signal using the first antenna 112a as part of a second dwelling period $P_2$ 917b.

If an antenna 112 is consecutively selected as the optimal antenna, and the dwelling period duration 250 is not a maximum dwelling period 246, the mobile device 104 may increase the dwelling period duration 250 by a dwelling period extension scaling factor 244. For example, the second dwelling period duration $P_2$ 917b may be the default dwelling period duration 254 plus a dwelling period extension scaling factor 244. The dwelling period extension scaling factor 244 may depend on the number of consecutive times an antenna 112 has been selected as the optimal antenna. If the dwelling period duration 250 is the maximum dwelling period 246, the mobile device 104 may continue using the maximum dwelling period 246 as the dwelling period duration 250.

Each dwelling period duration 250 may be incrementally larger or smaller than the previous dwelling period duration 250. Alternatively, each dwelling period duration 250 may be the same as the previous dwelling period duration 250.

Once the second dwelling period $P_2$ 917b has elapsed, the mobile device 104 may switch 901d to transmitting 915 the signal using the second antenna 112b as part of a testing period 903c. Once the testing period 903c has elapsed, the mobile device 104 may compare the transmit power of the second antenna 112b with the transmit power of the first antenna 112a from the second dwelling period $P_2$ 917b. If the transmit power of the second antenna 112b is lower than the transmit power of the first antenna 112a, the mobile device 104 may continue to transmit 915 the signal using the second antenna 112b as part of a third dwelling period $P_3$ 917c. In other words, the mobile device 104 may select the second antenna 112b as the optimal antenna for the third dwelling period $P_3$ 917c. The duration of the third dwelling period $P_3$ 917c may be the default dwelling period 254. The third dwelling period $P_3$ 917c may begin concurrently with the hypothesis testing period 903c.

Once the third dwelling period $P_3$ 917c has elapsed, the mobile device 104 may switch 901e to transmitting 919 the signal using the first antenna 112a as part of a testing period 903d. Once the testing period 903d has elapsed, the mobile device 104 may compare the transmit power for the first antenna 112a with the transmit power for the second antenna 112b from the third dwelling period $P_3$ 917c. If the transmit power for the first antenna 112a is less than the transmit power for the second antenna 112b, the mobile device 104 may select the first antenna 112a as the optimal antenna for a fourth dwelling period $P_4$ 917d. Because the optimal antenna selected for the third dwelling period $P_3$ 917c is different than the optimal antenna selected for the fourth dwelling period $P_4$ 917d, the duration of the fourth dwelling period $P_4$ 917d may be the duration of the third dwelling period $P_3$ 917c minus a dwelling period reduction scaling factor 242. In other words, the duration of the fourth dwelling period $P_4$ 917d may be the default dwelling period duration 254 minus a dwelling period reduction scaling factor 242. The dwelling period duration 250 may depend on the number of consecutive times a different antenna 112 has been selected as the optimal antenna. If the dwelling period duration 250 is the minimum dwelling period 248, the mobile device 104 may continue using the minimum dwelling period 248 as the dwelling period duration 250.

Once the fourth dwelling period $P_4$ 917d has elapsed, the mobile device 104 may switch 901f to transmitting 923 the signal using the second antenna 112b as part of a testing period 903e. Once the testing period 903e has elapsed, the mobile device 104 may compare the transmit power for the first antenna 112a from the fourth dwelling period $P_4$ 917d with the transmit power for the second antenna 112b. If the transmit power for the second antenna 112b is less than the transmit power for the first antenna 112a, the mobile device 104 may select the second antenna 112b as the optimal antenna for a fifth dwelling period $P_5$ 917e. Because the optimal antenna selected for the fourth dwelling period $P_4$ 917d is different than the optimal antenna selected for the fifth dwelling period $P_5$ 917e, the duration of the fifth dwelling period $P_5$ 917e may be the duration of the fourth dwelling period $P_4$ 917d minus the dwelling period reduction scaling factor 242. In other words, the duration of the fifth dwelling period $P_5$ 917e may be the default dwelling period duration 254 minus twice the dwelling period reduction scaling factor 242. A minimum dwelling period 248 may be set, beyond which adaptation of the dwelling period duration 250 is not allowed.

Once the fifth dwelling period $P_5$ 917e has elapsed, the mobile device 104 may switch 901g to transmitting 925 the signal using the first antenna 112a as part of a testing period 903f. Once the testing period 903f has elapsed, the mobile device 104 may compare the transmit power for the second antenna 112b from the fifth dwelling period $P_5$ 917e with the transmit power for the first antenna 112a. If the transmit power for the second antenna 112b is less than the transmit power for the first antenna 112a, the mobile device 104 may select the second antenna 112b as the optimal antenna for the next dwelling period. The mobile device 104 may switch 901h to transmitting 927 the signal as part of the next dwelling period.

Figure 10:
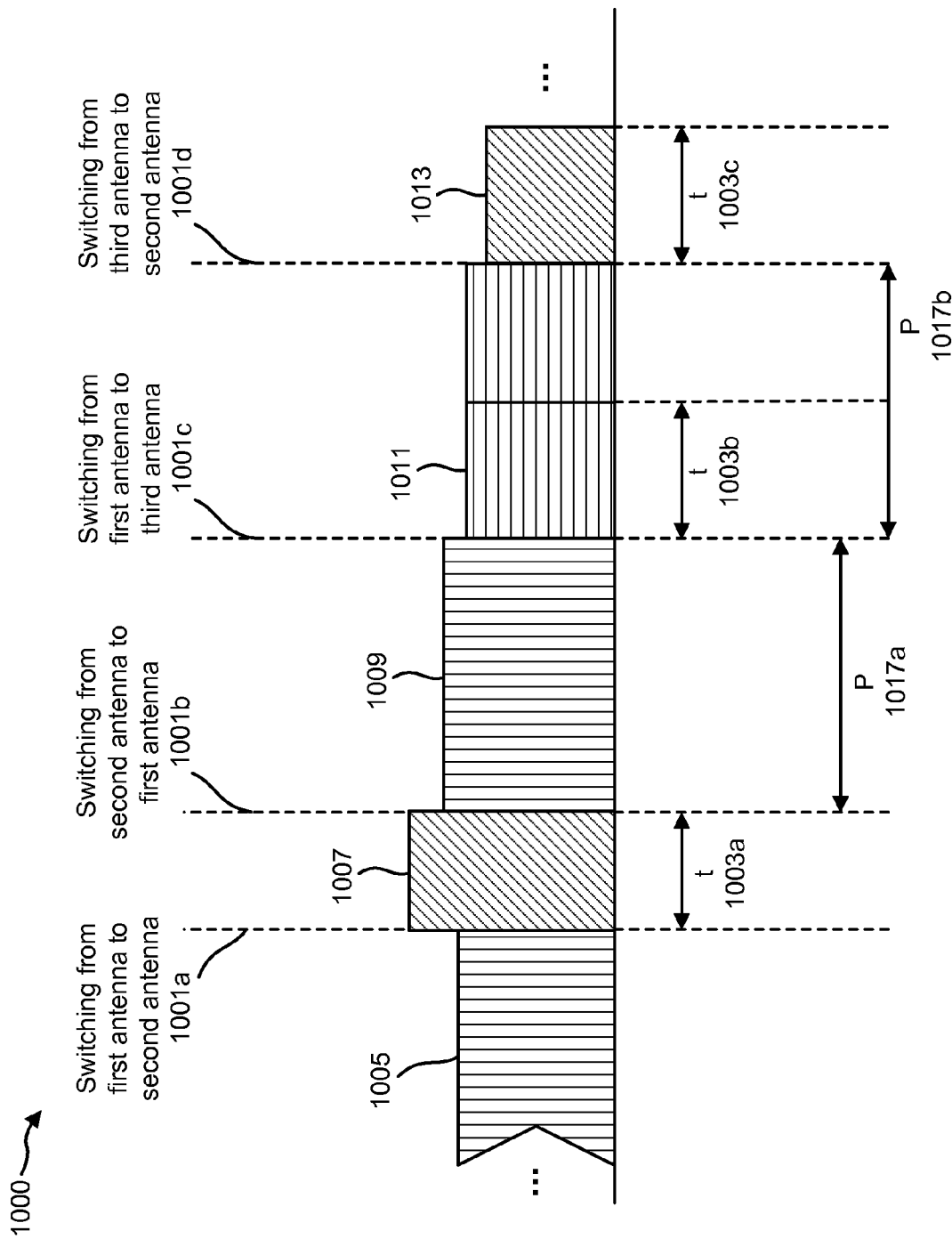
FIG. 10 illustrates a timing diagram for power control based antenna switching using hypothesis-testing to determine the optimal antenna by a mobile device with three antennas.

FIG. 10 illustrates a timing diagram 1000 for power control based antenna switching using hypothesis-testing to determine the optimal antenna by a mobile device 104 with three antennas 112. The mobile device 104 may send 1005 transmissions to a base station 102 using a first antenna 112a. The mobile device 104 may then switch 1001a to sending 1007 transmissions using a second antenna 112b as part of a testing period 1003a. At the end of the testing period 1003a, the mobile device 104 may compare the transmit power of the second antenna 112b with the transmit power of the first antenna 112a from a previous dwelling period to determine the optimal antenna. If the transmit power of the first antenna 112a is less than the transmit power of the second antenna 112b, the mobile device 104 may switch 1001b to sending 1009 transmissions to the base station 102 using the first antenna 112a. The mobile device 104 may send 1009 transmissions to the base station 102 using the first antenna 112a for a dwelling period 1017a.

Once the dwelling period 1017a has elapsed, the mobile device 104 may switch 1001c to sending 1011 transmissions to the base station 102 using a third antenna 112 as part of a testing period 1003b. Once the testing period 1003b has elapsed, the mobile device 104 may compare the transmit power of the third antenna 112 with the transmit power of the first antenna 112a from the previous dwelling period 1017a to determine the optimal antenna. If the transmit power of the third antenna 112 is less than the transmit power of the first antenna 112a, the mobile device 104 may select the third antenna 112 as the optimal antenna. The mobile device 104 may continue to send 1011 transmissions to the base station 102 using the third antenna 112 for a dwelling period 1017b. The dwelling period 1017b may begin concurrently with the beginning of the hypothesis testing period 1003b.

Once the dwelling period 1017b has elapsed, the mobile device 104 may switch 1001d to sending 1013 transmissions to the base station 102 using the second antenna 112b as part of a testing period 1003c. Alternatively, the mobile device 104 may switch to sending transmissions to the base station 102 using the first antenna 112a as part of a hypothesis testing period.

FIG. 10A illustrates an alternative timing diagram 1000A for power control based antenna switching using hypothesis-testing to determine the optimal antenna by a mobile device with three antennas. The mobile device 104 may send 1029 transmissions to a base station 102 using a first antenna 112a. The mobile device 104 may then switch 1045a to sending 1031 transmissions using a second antenna 112b as part of a first testing period 1041a. At the end of the first testing period 1041a, the mobile device 104 may switch 1045b to sending 1033 transmissions using a third antenna 112 as part of a second testing period 1041b. At the end of the second testing period 1041b, the mobile device 104 may switch 1045c to sending 1035 transmissions using the first antenna 112a as part of a third testing period 1041c. The mobile device 104 may switch 1045 between each of the antennas 112 available before selecting an antenna 112 as the optimal antenna. Alternatively, the mobile device 104 may only switch 1045 between antennas 112 not selected for the previous dwelling period before selecting an antenna 112 as the optimal antenna.

The mobile device 104 may then compare the transmit powers of each of the antennas 112. For example, the mobile device may compare the transmit power of the first antenna 112a during the third testing period 1041c with the transmit power of the second antenna 112b during the first testing period 1041a and the transmit power of the third antenna 112 during the second testing period 1041b to determine the optimal antenna. The mobile device 104 may select the antenna 112 with the lowest transmit power as the optimal antenna. If the transmit power of the third antenna 112 is less than the transmit power of the first antenna 112a and the transmit power of the second antenna 112b, the mobile device 104 may switch 1045d to sending 1037 transmissions to the base station 102 using the third antenna 112. The mobile device 104 may send 1037 transmissions to the base station 102 using the third antenna 112 for a dwelling period 1043.

Once the dwelling period 1043 has elapsed, the mobile device 104 may switch 1045e to sending 1039 transmissions to the base station 102 using the second antenna 112b as part of a fourth testing period 1041d. Alternatively, the mobile device 104 may switch 1045 to sending transmission to the base station 102 using the first antenna 112a as part of the fourth testing period 1041d.

Figure 11:
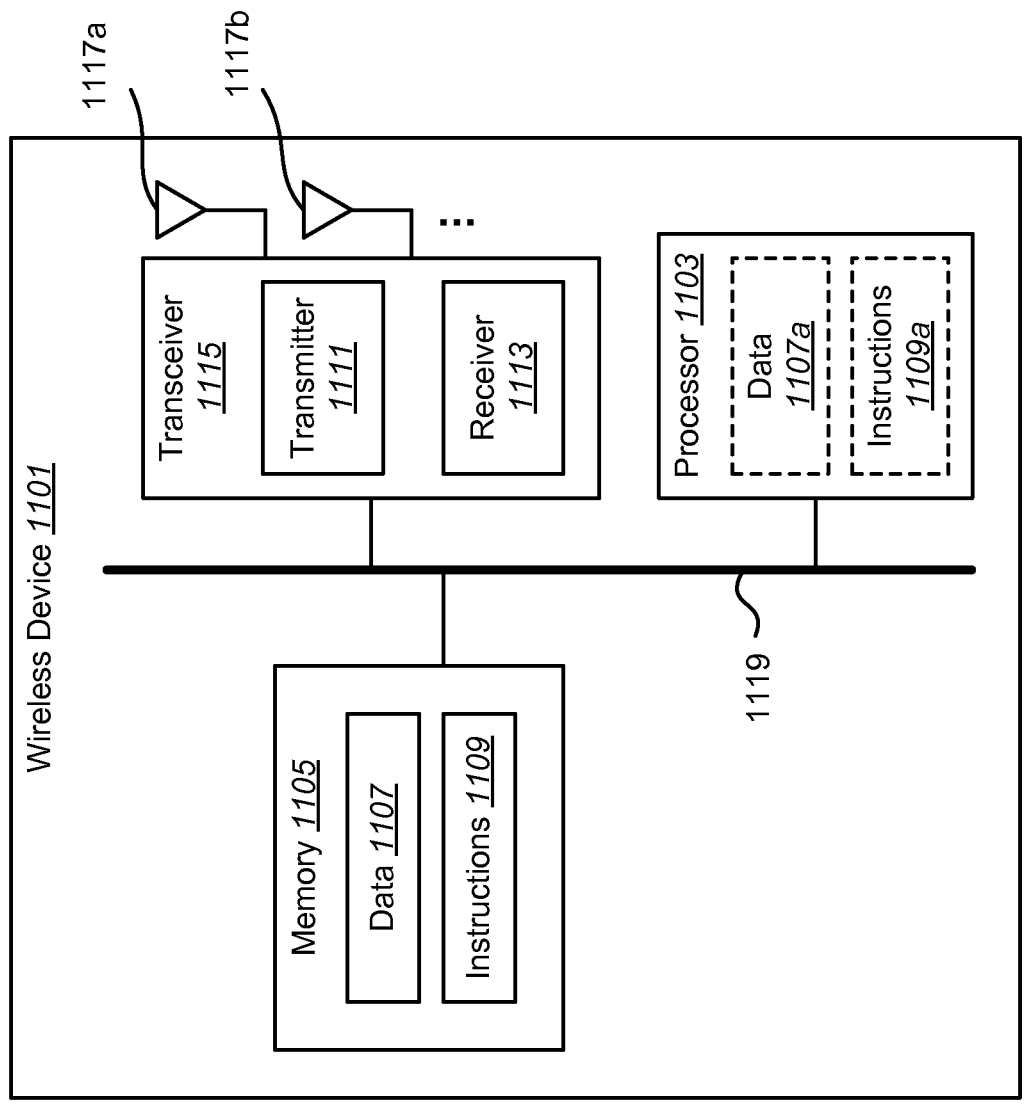
FIG. 11 illustrates various components that may be utilized in a wireless device.

FIG. 11 illustrates certain components that may be included within a wireless device 1101. The wireless device 1101 may be a mobile device 104.

The wireless device 1101 includes a processor 1103. The processor 1103 may be a general purpose single- or multi-chip microprocessor (e.g., an ARM), a special purpose microprocessor (e.g., a digital signal processor (DSP)), a microcontroller, a programmable gate array, etc. The processor 1103 may be referred to as a central processing unit (CPU). Although just a single processor 1103 is shown in the wireless device 1101 of FIG. 11, in an alternative configuration, a combination of processors (e.g., an ARM and DSP) could be used.

The wireless device 1101 also includes memory 1105. The memory 1105 may be any electronic component capable of storing electronic information. The memory 1105 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1107 and instructions 1109 may be stored in the memory 1105. The instructions 1109 may be executable by the processor 1103 to implement the methods disclosed herein. Executing the instructions 1109 may involve the use of the data 1107 that is stored in the memory 1105. When the processor 1103 executes the instructions 1109, various portions of the instructions 1109a may be loaded onto the processor 1103, and various pieces of data 1107a may be loaded onto the processor 1103.

The wireless device 1101 may also include a transmitter 1111 and a receiver 1113 to allow transmission and reception of signals to and from the wireless device 1101. The transmitter 1111 and receiver 1113 may be collectively referred to as a transceiver 1115. Multiple antennas 1117 may be electrically coupled to the transceiver 1115. The wireless device 1101 may also include (not shown) multiple transmitters, multiple receivers and/or multiple transceivers.

The various components of the wireless device 1101 may be coupled together by one or more buses, which may include a power bus, a control signal bus, a status signal bus, a data bus, etc. For the sake of clarity, the various buses are illustrated in FIG. 11 as a bus system 1119.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The terms "computer-readable medium" or "computer-program product" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 4, 5 and 7, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for selecting an antenna, the method comprising: transmitting a signal using a first antenna with a first metric and a radio frequency (RF) chain for a first dwelling period; switching to transmitting the signal using a second antenna with a second metric for a first testing period of the signal following an end of the first dwelling period of the signal, wherein the second antenna uses the same RF chain as the first antenna; comparing the first metric from the first dwelling period of the signal with the second metric from the first testing period of the signal following the end of the first dwelling period of the signal; determining based on the comparing of the first metric with the second metric whether to continue transmitting the signal using the second antenna or to switch to transmitting the signal using the first antenna; wherein the first dwelling period is adapted according to channel variations, and wherein the first dwelling period is increased by a dwelling period extension scaling factor if the first antenna is consecutively selected as the optimal antenna and the first dwelling period is not a maximum dwelling period.

2. The method of claim 1, wherein the first metric comprises a transmission pilot power for the first antenna and the second metric comprises a transmission pilot power for the second antenna.

3. The method of claim 1, wherein the first metric comprises a total transmission power for the first antenna and the second metric comprises a total transmission power for the second antenna.

4. The method of claim 1, wherein the first metric comprises a received signal information measurement for the first antenna and the second metric comprises a received signal information measurement for the second antenna.

5. The method of claim 1, further comprising:
receiving a power control bit from a base station; and
adjusting the first metric according to the received power control bit.

6. The method of claim 1, further comprising:
receiving a power control bit from a base station; and
adjusting the second metric according to the received power control bit.

7. The method of claim 1, further comprising transmitting using the optimal antenna for a second dwelling period before beginning a second testing period.

8. The method of claim 1, wherein the first testing period is prematurely ended if the second metric is worse than the first metric by a testing threshold.

9. The method of claim 1, wherein the first dwelling period is prematurely ended if the first metric is worse by more than a dwelling metric threshold for a dwelling time threshold.

10. The method of claim 1, wherein the first dwelling period is decreased by a dwelling period reduction scaling factor if a different antenna was selected as the optimal antenna for the previous dwelling period, and the first dwelling period is not a minimum dwelling period.

11. The method of claim 1, wherein selecting the optimal antenna comprises selecting an antenna with a better metric.

12. The method of claim 1, wherein the RF chain comprises a single power amplifier.

13. The method of claim 1, wherein the RF chain comprises a digital-to-analog convertor (DAC), a radio frequency (RF) mixer, a driver amplifier, and a single power amplifier.

14. A wireless device configured for selecting an antenna, the wireless device comprising: a processor; memory in electronic communication with the processor; and instructions stored in the memory, the instructions being executable by the processor to: transmit a signal using a first antenna with a first metric and a radio frequency (RF) chain for a first dwelling period; switch to transmitting the signal using a second antenna with a second metric for a first testing period of the signal following an end of the first dwelling period of the signal, wherein the second antenna uses the same RF chain as the first antenna; compare the first metric from the first dwelling period of the signal with the second metric from the first testing period of the signal following the end of the first dwelling period of the signal;
determine based on the comparing of the first metric with the second metric whether to continue transmitting the signal using the second antenna or to switch to transmitting the signal using the first antenna; wherein the first dwelling period is adapted according to channel variations, and wherein the first dwelling period is increased by a dwelling period extension scaling factor if the first antenna is consecutively selected as the optimal antenna and the first dwelling period is not a maximum dwelling period.

15. The wireless device of claim 14, wherein the first metric comprises a transmission pilot power for the first antenna and the second metric comprises a transmission pilot power for the second antenna.

16. The wireless device of claim 14, wherein the first metric comprises a total transmission power for the first antenna and the second metric comprises a total transmission power for the second antenna.

17. The wireless device of claim 14, wherein the first metric comprises a received signal information measurement for the first antenna and the second metric comprises a received signal information measurement for the second antenna.

18. The wireless device of claim 14, wherein the instructions are further executable to:
receive a power control bit from a base station; and
adjust the first metric according to the received power control bit.

19. The wireless device of claim 14, wherein the instructions are further executable to:
receive a power control bit from a base station; and
adjust the second metric according to the received power control bit.

20. The wireless device of claim 14, wherein the instructions are further executable to transmit using the optimal antenna for a second dwelling period before beginning a second testing period.

21. The wireless device of claim 14, wherein the first testing period is prematurely ended if the second metric is worse than the first metric by a testing threshold.

22. The wireless device of claim 14, wherein the first dwelling period is prematurely ended if the first metric is worse by more than a dwelling metric threshold for a dwelling time threshold.

23. The wireless device of claim 14, wherein the first dwelling period is decreased by a dwelling period reduction scaling factor if a different antenna was selected as the optimal antenna for the previous dwelling period, and the first dwelling period is not a minimum dwelling period.

24. The wireless device of claim 14, wherein selecting the optimal antenna comprises selecting an antenna with a better metric.

25. The wireless device of claim 14, wherein the RF chain comprises a single power amplifier.

26. The wireless device of claim 14, wherein the RF chain comprises a digital-to-analog convertor (DAC), a radio frequency (RF) mixer, a driver amplifier, and a single power amplifier.

27. An apparatus that is configured for selecting an antenna, the apparatus comprising: means for transmitting a signal using a first antenna with a first metric and a radio frequency (RF) chain for a first dwelling period; means for switching to transmitting the signal using a second antenna with a second metric for a first testing period of the signal following an end of the first dwelling period of the signal, wherein the second antenna uses the same RF chain as the first antenna; means for comparing the first metric from the first dwelling period of the signal with the second metric from the first testing period of the signal following the end of the first dwelling period of the signal; means for determining based on the comparing of the first metric with the second metric whether to continue transmitting the signal using the second antenna or to switch to transmitting the signal using the first antenna; wherein the first dwelling period is adapted according to channel variations, and wherein the first dwelling period is increased by a dwelling period extension scaling factor if the first antenna is consecutively selected as the optimal antenna and the first dwelling period is not a maximum dwelling period.

28. A computer-program product stored in a tangible computer-readable medium for selecting an antenna, the computer-readable medium having instructions thereon, the instructions comprising: code for transmitting a signal using a first antenna with a first metric and a radio frequency (RF) chain for a first dwelling period; code for switching to transmitting the signal using a second antenna with a second metric for a first testing period of the signal following an end of the first dwelling period of the signal, wherein the second antenna uses the same RF chain as the first antenna; code for comparing the first metric from the first dwelling period of the signal with the second metric from the first testing period of the signal following the end of the first dwelling period of the signal; and code for determining based on the comparing of the first metric and the second metric whether to continue transmitting the signal using the second antenna or to switch to transmitting the signal with the first antenna; wherein the first dwelling period is adapted according to channel variations, and wherein the first dwelling period is increased by a dwelling period extension scaling factor if the first antenna is consecutively selected as the optimal antenna and the first dwelling period is not a maximum dwelling period.

* * * * *